United States Patent [19]
Hayashida

[11] 4,162,616
[45] Jul. 31, 1979

[54] HYDRAULIC MASTER CYLINDER

[75] Inventor: Yoshihiro Hayashida, Chigasaki, Japan

[73] Assignee: Tokico Ltd., Kanagawa, Japan

[21] Appl. No.: 841,435

[22] Filed: Oct. 12, 1977

Related U.S. Application Data

[62] Division of Ser. No. 678,718, Apr. 2, 1976, abandoned.

[51] Int. Cl.² .............................................. F15B 7/00
[52] U.S. Cl. ........................................ 60/533; 60/594; 92/165 PR; 92/168; 92/171
[58] Field of Search ............ 92/169, 171, 168, 165 PR; 60/588, 592, 533, 594; 285/55

[56] References Cited

U.S. PATENT DOCUMENTS

| | | | |
|---|---|---|---|
| 2,156,205 | 4/1939 | Swift | 60/588 |
| 2,759,329 | 8/1956 | Ponti | 92/171 |
| 2,808,703 | 10/1957 | Baldwin | 60/588 |
| 3,030,777 | 4/1962 | Springmeier | 60/588 |
| 3,156,097 | 11/1964 | Brown | 60/588 |

Primary Examiner—Martin P. Schwadron
Assistant Examiner—Abraham Hershkovitz
Attorney, Agent, or Firm—Wenderoth, Lind & Ponack

[57] ABSTRACT

An improved hydraulic master cylinder for use in a vehicle braking system wherein the housing of the master cylinder is formed of a material such as synthetic resin, aluminum alloy or the like and a cylindrical liner formed of corrosion-resistant and wear-proof metal is mounted in the housing to receive a piston slidably therein.

5 Claims, 7 Drawing Figures

HYDRAULIC MASTER CYLINDER

This application is a divisional of Ser. No. 678,718, filed Apr. 2, 1976, now abandoned.

BACKGROUND OF THE INVENTION

This invention relates to a hydraulic master cylinder for use in a vehicle braking system.

In the hydraulic master cylinder hithertofore proposed, a housing constituting the main body of the master cylinder for receiving a piston slidably therein has been formed of material such as cast iron or cast aluminum alloy. When the housing is formed of cast iron, it is advantageous in that cast iron is corrosion-resistant with respect to braking fluid, but there are shortcomings in that the weight of the master cylinder increases, and the cost for machining a portion for fitting a braking lever thereto, a portion for fitting the master cylinder to the vehicle, and a portion constituting an oil reservoir, a portion constituting cylinder and oil passages or the like becomes expensive since these portions usually have complicated configurations and high accuracy is required in the machining operation.

When the housing is formed of cast aluminum alloy by utilizing a gravity casting process, it is possible to reduce the weight of the master cylinder, which can be easily cast and can be machined easily. However, the cast aluminum alloy has shortcomings in that excessive corrosion will be observed in the metal exposed to braking fluid under pressure and excessive wear will occur in the portion bearing the moving parts such as a piston, and internal defects in the cast material such as porosity or internal cavities will cause leakage of braking fluid or obstruction to smooth operation of the master cylinder.

When the housing is formed by a pressure die-casting process, it is possible to obtain a housing having a beautiful appearance and a complicated construction but usually the casting is porous and, thus, the housing must be protected from being exposed to braking fluid under pressure.

SUMMARY OF THE INVENTION

Accordingly, an object of the present invention is to overcome the aforementioned shortcomings of the prior art hydraulic master cylinders.

According to the present invention, there is provided a hydraulic master cylinder for use in a vehicle braking system comprising a housing formed of materials such as synthetic resin, aluminum alloy, magnesium alloy, zinc, titanium or the like for mounting a liner therein, and the liner is adapted to receive a piston slidably therein and is formed of corrosion-resistant and wear-proof material such as stainless steel, brass, bronze or the like.

Preferably, the liner is formed of pipe material so that a machining operation for finishing the internal surface of the cylinder portion is unnecessary.

The housing may be formed either by a gravity casting process or by a pressure die-casting process.

The liner may be force fitted into the housing, or alternately the liner may be unitarily molded or cast in the housing. As a further alternative, the liner may be removably engaged with the housing.

According to the present invention, it is possible to reduce the weight of the master cylinder, and it is easy to form the housing with a complicated configuration utilizing a material with superior castability and inferior corrosion resistance.

Further, since the liner is formed of corrosion-resistant and wear-proof material such as stainless steel pipe, bronze pipe, brass pipe or the like, it is possible to improve the durability of the master cylinder and to assure smooth operation of the master cylinder.

When the liner is unitarily mounted in the housing by a pressure die-casting process or a gravity die casting process, the housing will tightly engage with the outer surface of the liner by thermal shrinkage, and thus it is not required to use any seal for preventing leakage of oil through the boundary area between the liner and the housing.

When the liner is removably mounted in the housing, it is preferable to apply an axial force on the liner urging it against a shoulder formed in the housing by utilizing a clamping member threadedly engaging the liner or the housing. The clamping member may additionally serve as a fitting member for connecting a pipe line which supplies fluid under pressure to the wheel cylinders.

In applying the present invention to a tandem master cylinder, it is preferable to secure one or more cylindrical members formed of same material to the liner on the outer periphery of the liner for guiding pressure fluid from the master cylinder, and thereafter cast the housing around the liner.

BRIEF DESCRIPTION OF THE DRAWINGS

These and other objects and advantages of the present invention will become apparent from the following detailed description taken in connection with the accompanying drawings, in which.

DETAILED DESCRIPTION OF THE INVENTION

Figure 1:
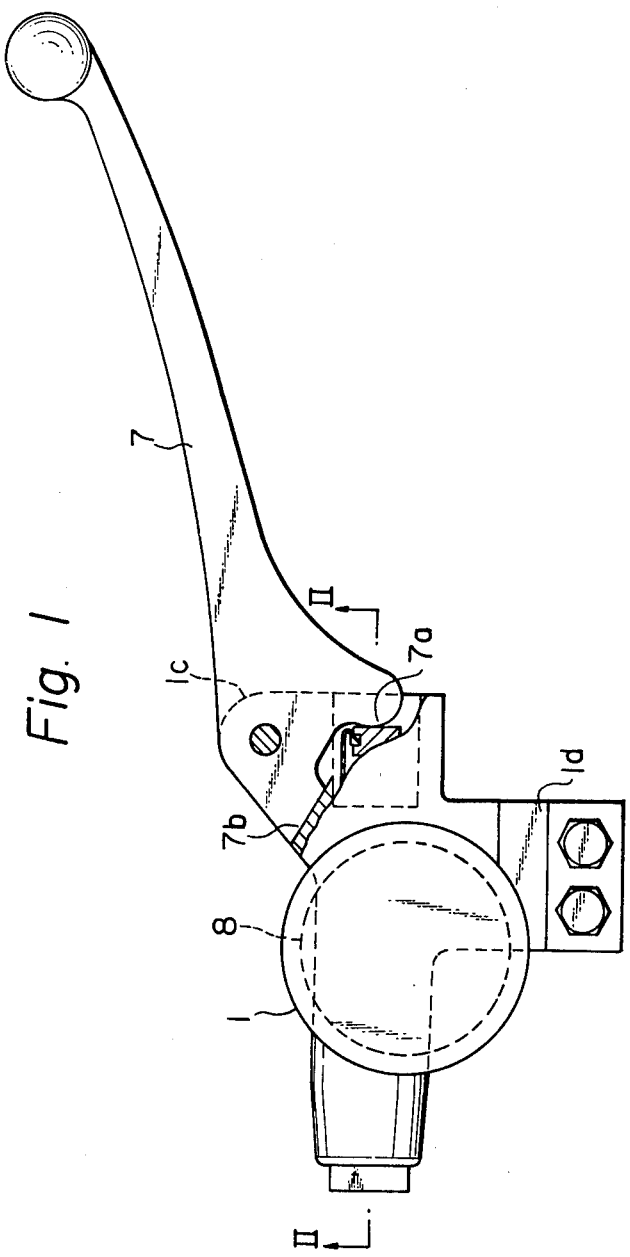
FIG. 1 is a partially cut-away plan view of a hydraulic master cylinder shown as an embodiment of the present invention.
Figure 2:
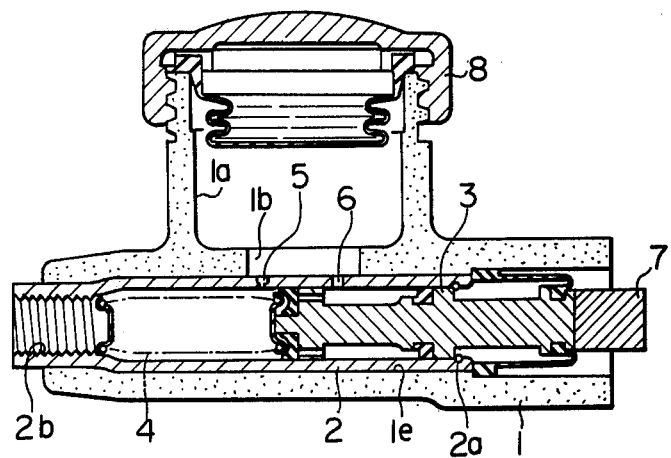
FIG. 2 is a cross-sectional view taken along line II—II in FIG. 1.
Figure 3:
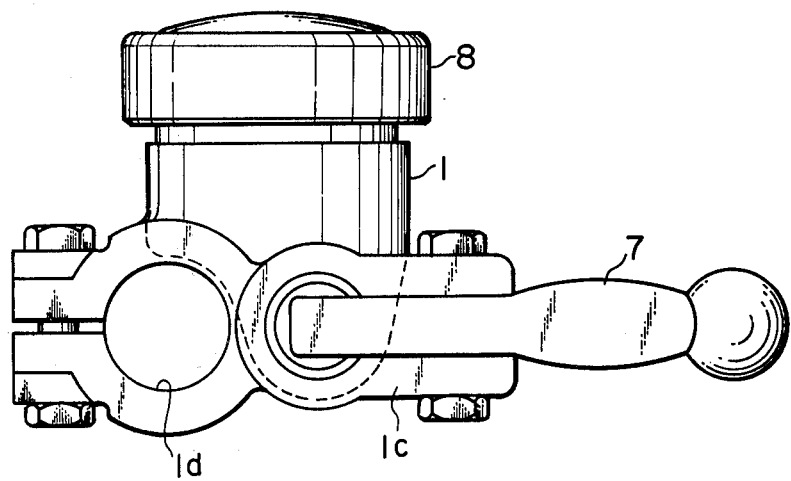
FIG. 3 is a side elevational view of the cylinder shown in FIG. 1.

A hydraulic master cylinder shown in FIGS. 1–3 comprises a housing 1 consisting of a reservoir portion 1a for containing braking fluid therein, a cylindrical portion 1e for incorporating a hydraulic cylinder piston device therein, a bore portion 1b for communicating the cylindrical portion 1e with the reservoir portion 1a, a bracket portion 1c for mounting an actuating lever 7 thereon, and a mounting portion 1d for mounting the housing on a chasis or the like of a vehicle. Preferably, the housing 1 is formed by a gravity casting process or a pressure die-casting process utilizing synthetic resin or aluminum alloy or the like.

A cylindrical liner 2 formed of corrosion-resistant and wear-proof material such as stainless steel brass, bronze or the like is mounted in the cylindrical portion 1e of the housing 1. The liner 2 may be mounted in the cylindrical portion 1e by a force-fitting process, or the housing 1 may be molded or cast around the liner 2. An annular groove 2a for receiving a snap ring therein is formed in the inner circumference of the liner 2 at one end thereof, and internal screw threads 2b for receiving a fitting (not shown) are formed at the other end of the liner 2 for connecting a pipe line to wheel cylinders (not shown). A piston 3 is slidably fitted in the liner 2 and is biassed toward the brake lever 7 (left-ward in FIGS. 1 and 2) by a spring 4. A relief port 5 and a supply port 6 connect the interior of the liner 2 with the bore portion 1b of the housing 1. The brake lever 7 is pivotally mounted on the bracket portion 1c of the housing 1 and acts on one end of the piston 3. A cap 8 covers the open end of the reservoir portion 1a of the housing 1.

In the master cylinder having a construction as described above, the housing 1 is not exposed to braking fluid under pressure, thus, the housing can be fabricated of synthetic resin, aluminum alloy or the like, and durability of the master cylinder can be improved by fabricating the liner 2 of corrosion-resistant and wear-proof material such as stainless steel or the like. Further, it is possible to omit a machining operation for finishing the inner surface of the cylinder portion of the liner 2 by utilizing a pipe material having a suitable inner diameter.

By utilizing a pressure die-casting process in fabricating the housing 1, it is possible to obtain a housing having a beautiful appearance with high dimensional accuracy, without applying any surface treatment, thus omitting machining operations for forming a reservoir portion, a braking lever mounting portion, and a vehicle chasis fitting portion, which machining operations have been required in prior art hydraulic master cylinders. Further, it is possible to apply a desired color on the outer surface of the housing which can improve the appearance of a vehicle when the master cylinder is installed on a motor-cycle.

Where the materials of the housing and the liner differ, and thus have different coefficients of heat expansion, separation of the liner from the housing which tends to occur during long periods of usage, is overcome by hydraulic pressure acting between the piston and the one end of the liner acting to move the liner relative to the housing toward the one end thereby preventing movement of the liner relative to the housing.

Since braking fluid under pressure is not exposed to the housing directly, defects such as porosity or the like which might be present in the casting will become tolerable.

Figure 4:
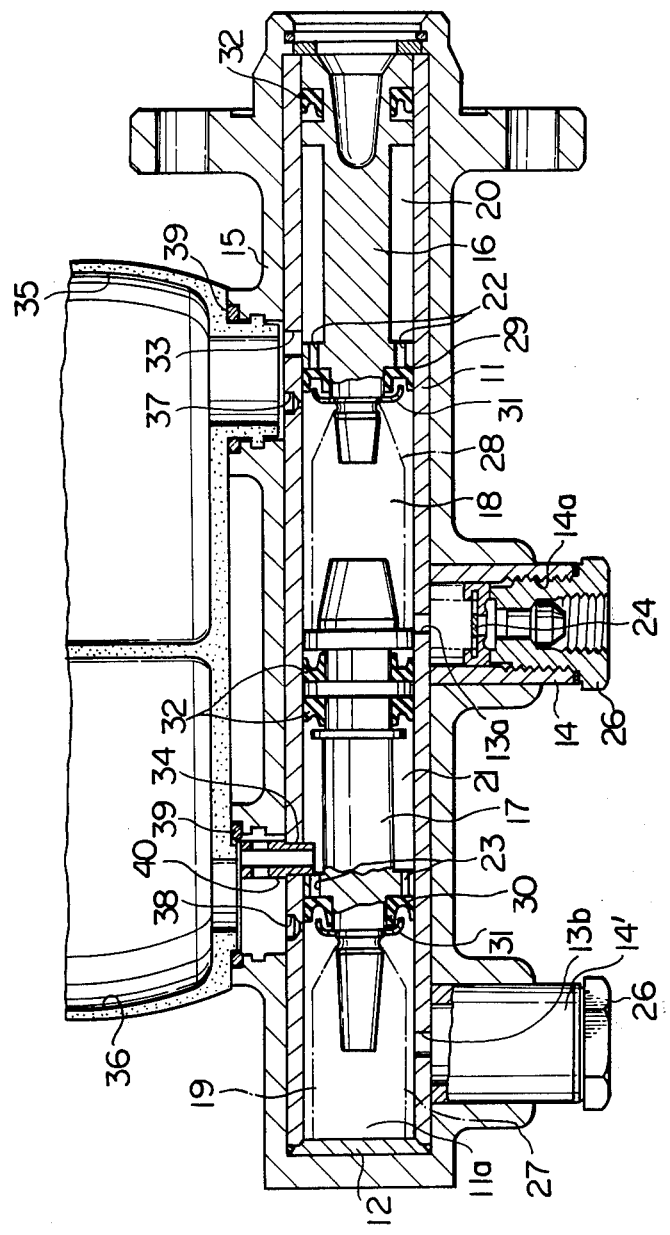
FIG. 4 is a longitudinal cross-section of a tandem master cylinder shown as a second embodiment of the present invention.

FIG. 4 shows a modified form of a hydraulic master cylinder according to the present invention, in which, a cylindrical liner 11 formed of a pipe material of corrosion-resistant and wear-proof material such as stainless steel, brass or the like acts as the cylinder portion of a tandem master cylinder. One end 11a of the liner 11 is sealingly closed by a bottom plate 12 formed of the same material. The liner 11 has in its cylindrical wall ports 13a and 13b for discharging fluid under pressure therethrough. Sleeves 14 and 14' having internal screw threads 14a respectively are secured to the outer circumference of the liner 11 surrounding respectively the ports 13a and 13b and project transversely relative to the liner 11. A suitable fitting (not shown) is connected to each of the sleeves 14 and 14' to supply fluid under pressure to associated wheel cylinders. A housing 15 is cast around the liner 11 by a die-casting process. The housing 15 is fabricated of a material such as synthetic resin or light metal such as aluminum alloy, magnesium alloy, titanium or the like. The housing 15 will tightly engage the liner 11 due to thermal shrinkage of the cast material.

A primary piston 16 and a secondary piston 17 are slidably fitted in the liner 11. A first pressure space 18 and a second pressure space 19 are defined respectively on the forward sides of respective pistons 16 and 17, and a first supply space 20 and a second supply space 21 are respectively defined around the pistons 16 and 17. Oil can be supplied into the first pressure space 18 from the first supply space 20 through a small hole 22 formed in the primary piston 16 and a cup-shaped seal 29, and also supplied into the second pressure space 19 from the second supply space 21 through a small hole 23 formed in the secondary piston 17 and a cup-shaped seal 30. Shown at 26 are plugs mounted respectively on the sleeves 14 and 14' for connecting respective pipe lines leading to wheel cylinders. A secondary spring 27 is disposed between the bottom plate 12 and the secondary piston 17, and a primary spring 28 is positioned between the primary and secondary pistons 16 and 17. The springs 27 and 28 act to bias the pistons 16 and 17 in the rightward direction in the drawing. Shown at 31 are retainers for locating the cup-shaped seals 29 and 30 on respective pistons 16 and 17 and normally closing the holes 22 and 23. Cup-shaped seals 32 seal the spaces 18, 20 and 21 respectively.

The liner 11 further has a first supply port 33 and a second supply port 34 for respectively permanently connecting a reservoir portion 35 with the first supply space 20 and a reservoir portion 36 with the second supply space 21, and also has a first relief port 37 and a second relief port 38 for respectively connecting the first pressure space 18 with the reservoir portion 35 and the second pressure space 19 with the reservoir portion 36 when the master cylinder is in the normal retracted position shown in the drawing. A reservoir incorporating the reservoir portions 35 and 36 is mounted on the housing 15 with a seal 39 disposed therebetween. A stop 40 forming the second supply port 34 acts as a stop for restricting the retracting movement of the secondary piston 17.

The sleeves 14 and 14' secured to the liner 11 act to form fittings connecting the pressure spaces 18 and 19 with wheel cylinders, and protect the housing 15 from being exposed to braking fluid under pressure.

Although the embodiment is shown as a tandem master cylinder, but it will be noted that the present invention may be applied to hydraulic master cylinders of any desired type other than the tandem type.

Figure 5:
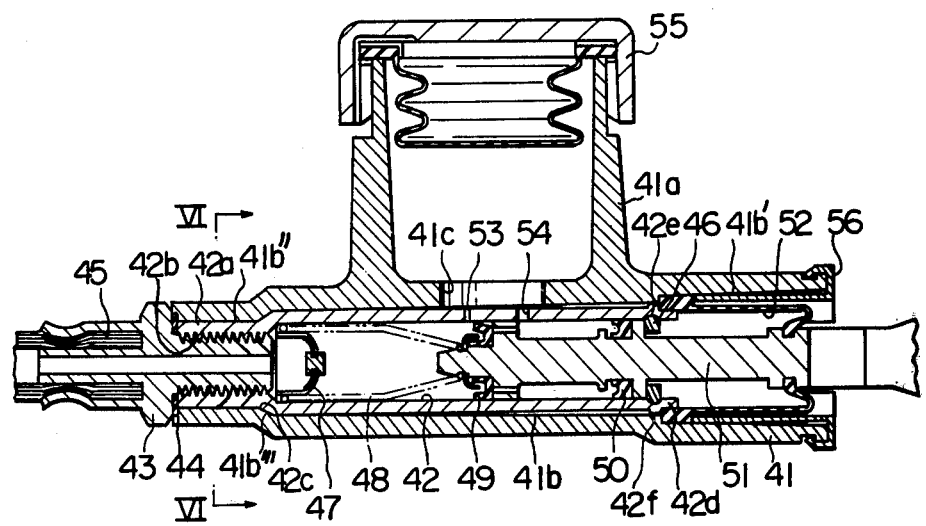
FIG. 5 is a longitudinal cross-section of a third embodiment of the present invention.
Figure 6:
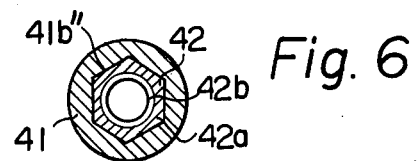
FIG. 6 is a cross-sectional view taken along line VI—VI in FIG. 5.

Another embodiment of the present invention is shown in FIGS. 5 and 6, in which, a housing 41 of a hydraulic master cylinder comprises a reservoir portion 41a, a cylindrical portion 41b for receiving a cylinder of the master cylinder therein, and a bore portion 41c connecting the cylinder portion 41b with the reservoir portion 41a. The housing 41 is formed of metal or non-metal material by a casting process.

The cylindrical portion 41b has a large diameter portion 41b' and a reduced diameter portion 41b'' as shown, and the small diameter portion 41b'' has a hexagonal cross-section as shown in FIG. 6.

A cylindrical liner 42 formed of a material such as stainless steel pipe or the like is inserted into the cylindrical portion 41b with a hexagonally shaped portion 42a thereof fitted in the reduced diameter portion 41b'' of the cylindrical portion 41b, so that the liner 42 is held in the housing for preventing relative rotation of the liner and the housing. A fitting 43 is threadingly engaged with internal screw threads 42b formed in the portion 42a of the liner 42. A stepped portion 42c is urged against a shoulder portion 41b''' formed in the cylindrical portion 41b by tightening the screw thread engagement, so that movement of the liner 42 in the axial direction is prevented. The fitting 43 has an axial bore for leading fluid under pressure to wheel cylinders through a pipe line 45. A seal 44 is disposed between the fitting 43 and the liner 42. A piston 51 having cup-shaped seals 49 and 50 is slidably positioned in the liner 42, and a spring 48 and a check valve 47 are positioned between the reduced diameter portion 42a and the forward end of the piston 51. The retracting movement of the piston 51 is restricted by a C-shaped ring or a stop 46 engaging with an annular groove 42e formed in the inner surface of the liner 42 at the axial end portion 42d of the cylindrical liner 42 by deforming that portion radially outward so as to form the groove 42e and the projection 42f. One end of a rubber boot 52 is clamped between the enlarged diameter portion 41b' of the housing and the outer periphery of the end portion 42d of the liner 42 for preventing leakage of oil from the reservoir 41a. The other end of the boot 52 is fitted around the piston 51 for preventing ingress of dust, water or the like into the cylinder. A relief port 53 and a supply port 54 are formed in the liner 42 for connecting the interior of the liner 42 with the reservoir 41a. A cap 55 closes the open end of the reservoir 41a. The projecting portion 42f of the liner 42 tightly engages with the inner circumference of the cylindrical portion 41b of the housing and acts to prevent radial movement of the liner 42 with respect to the housing 41. A retainer 56 holds the boot 52 in its proper position.

In assembling the master cylinder it is possible to assemble the liner 42 as a sub-assembly incorporating the piston 51 into the housing 41.

Figure 7:
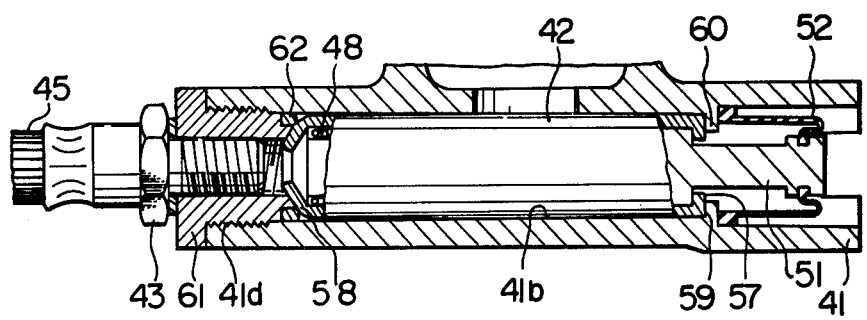
FIG. 7 is a cross sectional view of a modified form of the master cylinder of FIG. 5.

A modification of the master cylinder of FIGS. 5 and 6 is shown in FIG. 7, wherein a cylindrical liner 42 incorporating a piston 51, a spring 48 and other parts (not shown) similar to those shown in FIG. 5 therein has a stop 57 and a seat portion 58 at the opposite ends. The liner 42 is inserted into a cylindrical portion 41b of the housing 41 with the stop 57 engaging a projecting portion 60 of the cylindrical portion 41b through a packing 59. A fitting 61 threadingly engaging with internal screw threads 41d formed in the housing 41 urges a packing 62 against the seat portion 58 of the liner 42 and clamps the liner 42.

The construction of the master cylinder shown in FIG. 7 is otherwise the same as that of FIGS. 5 and 6, and corresponding numerals have been applied to corresponding parts.

The foregoing has been presented in order to show four embodiments of the present invention. It is not intended that such is to be limitative to the scope of the present invention, which may be realized from the appended claim.

What is claimed is:

1. A hydraulic master cylinder for use in a vehicle braking system, said master cylinder comprising:

a housing having extending therethrough a bore including a large diameter portion, a small diameter portion and a shoulder joining said large and small diameter portions;

a liner formed of a corrosion-resistant material and including a large diameter portion, a small diameter portion and a shoulder joining said large and small diameter portions of said liner;

said liner being tightly and nonrotatably positioned within said bore of said housing, with the outer surfaces of said large and small diameter portions of said liner tightly contacting the inner surfaces of said large and small diameter portions of said bore of said housing, respectively;

a piston slidably positioned within said liner;

said small diameter portion of said liner having a threaded inner surface; and a connecting member having an externally threaded portion in threaded engagement with said threaded inner surface of said small diameter portion of said liner and an outwardly extending flange axially abutting a free end surface of said housing, said connecting member thereby comprising means for axially urging said liner toward said small diameter portion of said bore and for thereby urging the outer surface of said shoulder of said liner against the inner surface of said shoulder of said bore, said connecting member having extending therethrough a passage for communicating the interior of said liner with an exterior wheel cylinder.

2. A hydraulic master cylinder as claimed in claim 1, further comprising means, provided in said small diameter portions of said bore and said liner, for preventing relative rotation between said housing and said liner.

3. A hydraulic master cylinder as claimed in claim 1, wherein said small diameter portions of said bore and said liner have complementary irregular noncircular configurations, thereby preventing relative rotation between said housing and said liner.

4. A hydraulic master cylinder as claimed in claim 3, wherein said small diameter portions of said bore and said liner have polygonal configurations.

5. A hydraulic master cylinder as claimed in claim 1, further comprising a flexible boot means clamped between the free ends of said large diameter portions of said bore and said liner for preventing the leakage of fluid therebetween and for preventing the ingress of foreign material therebetween.

* * * * *